United States Patent [19]
Noakes et al.

[11] Patent Number: 5,222,664
[45] Date of Patent: Jun. 29, 1993

[54] HAND-HELD ELECTROSTATIC SPRAYING DEVICE ADAPTED FOR SHOCK SUPPRESSION AND METHOD

[75] Inventors: Timothy J. Noakes, Pantymwyn, Wales; Brian Reed, Swindon; John J. Chambers, Cirencester, both of England

[73] Assignee: Imperial Chemical Industries PLC, London, England

[21] Appl. No.: 735,018

[22] Filed: Jul. 25, 1991

[30] Foreign Application Priority Data

Jul. 25, 1990 [GB] United Kingdom ................ 9016347
Jul. 3, 1991 [GB] United Kingdom ................ 9114343

[51] Int. Cl.$^5$ .......................... B05B 5/053; B05B 5/16
[52] U.S. Cl. ........................................ 239/3; 239/690; 239/691
[58] Field of Search ................ 239/690, 691, 708, 3; 118/627, 629

[56] References Cited

U.S. PATENT DOCUMENTS

| | | |
|---|---|---|
| 1,958,406 | 5/1934 | Darrah . |
| 4,336,275 | 6/1982 | Scholes .............. 118/627 X |
| 4,343,828 | 8/1982 | Smead et al. .......... 118/627 X |
| 4,462,061 | 7/1984 | Mommsen . |
| 4,549,243 | 10/1985 | Owen et al. .......... 239/690 X |
| 4,703,891 | 11/1987 | Jackson et al. ........ 239/691 X |
| 4,737,887 | 4/1988 | Thome .................. 239/691 X |
| 5,032,422 | 7/1991 | Lamirand et al. ...... 118/627 X |

FOREIGN PATENT DOCUMENTS

| | | | |
|---|---|---|---|
| 0274949 | 7/1988 | European Pat. Off. ...... | 239/691 |
| 2198900 | 5/1984 | United Kingdom . | |

Primary Examiner—Andres Kashnikow
Assistant Examiner—William Grant
Attorney, Agent, or Firm—Cushman, Darby & Cushman

[57] ABSTRACT

An electrostatic spraying device in which liquid emerging from an outlet (24) of the device nozzle (12) is subjected to an electrical field sufficiently high for the liquid to be drawn from the outlet as one or more ligaments which break up into charged droplets to form the spray. In order to provide shock suppression, the electrical field is produced by means of high voltage circuitry having a bi-polar output with a frequency no greater than 10 Hz.

14 Claims, 3 Drawing Sheets

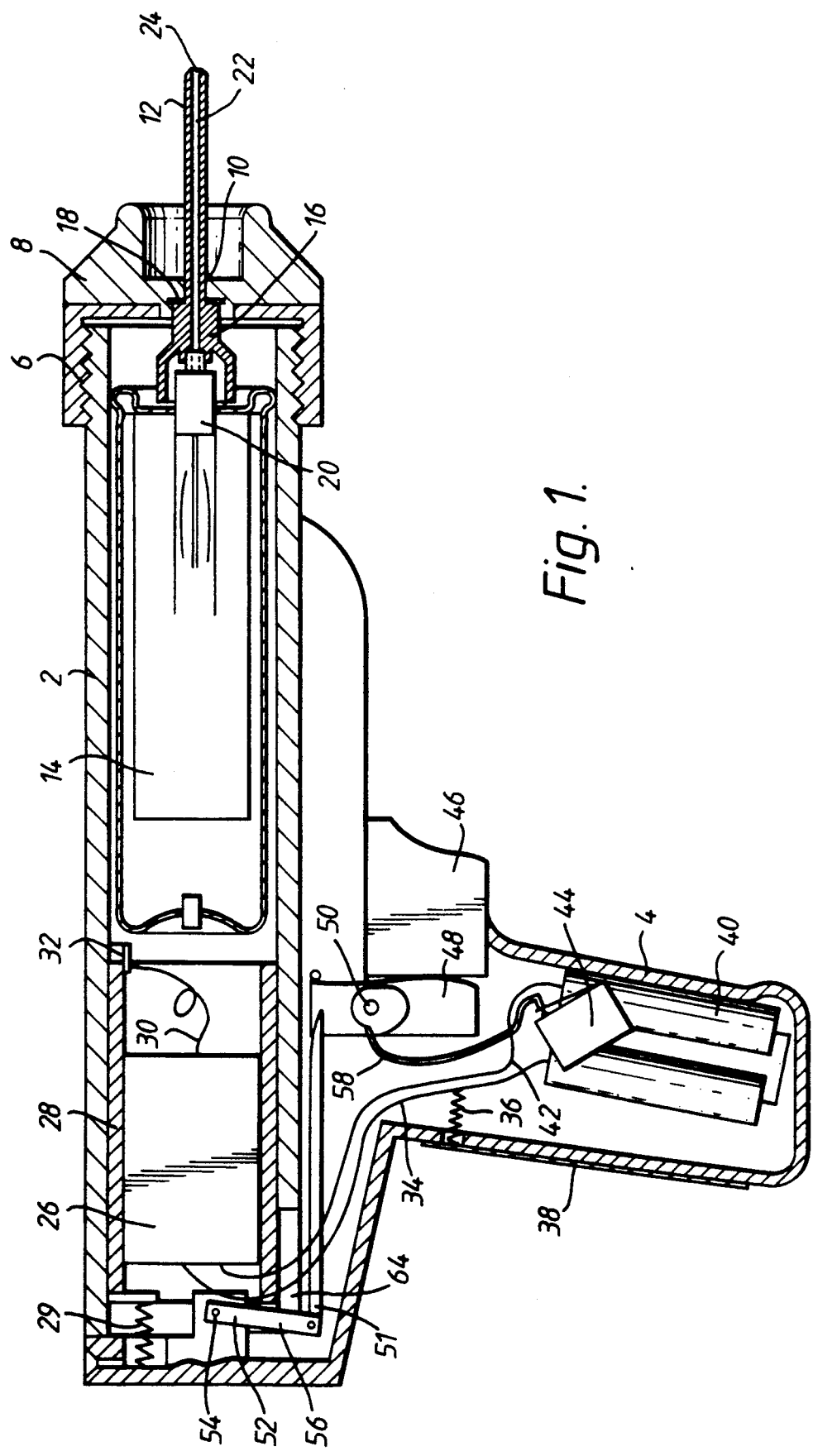

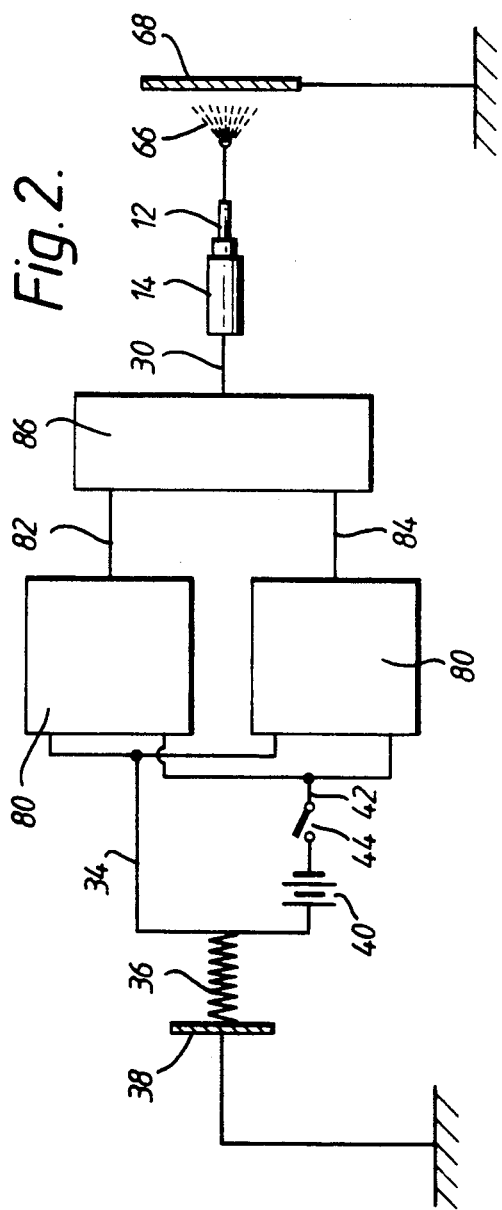
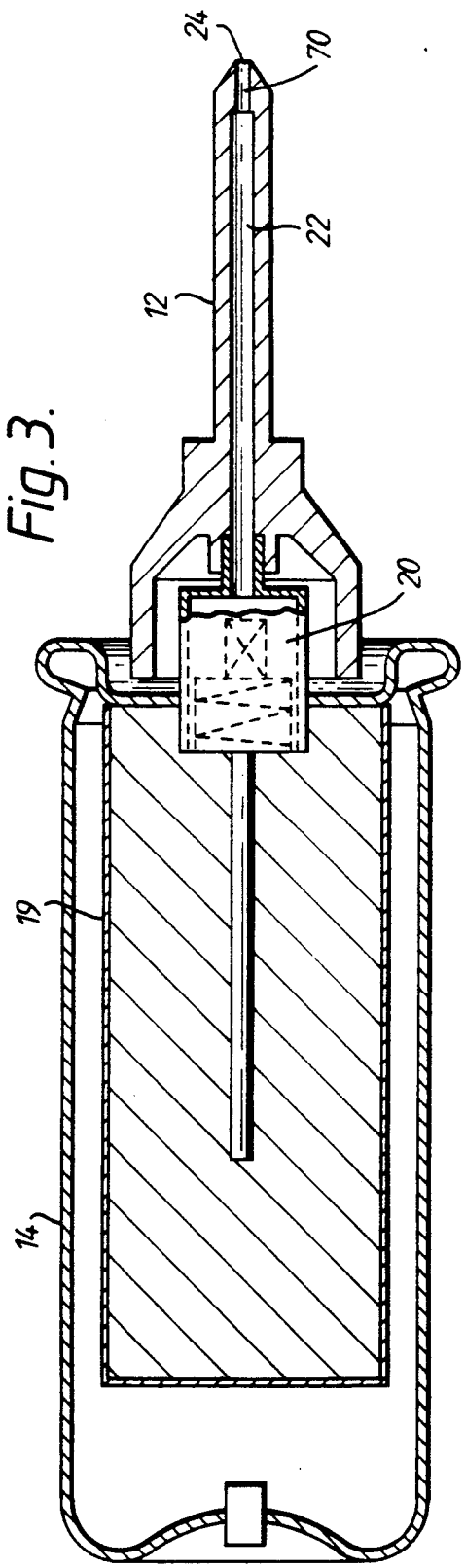

HAND-HELD ELECTROSTATIC SPRAYING DEVICE ADAPTED FOR SHOCK SUPPRESSION AND METHOD

BACKGROUND OF THE INVENTION

The present invention relates to electrostatic liquid spraying devices.

On the whole, such devices use a direct current high tension source in order to electrostatically charge the particles of the liquid spray. However, it is known from U.S. Pat. No. 1,958,406 to use a source of alternating potential in conjunction with an electrostatic spraying device but there is no explicit teaching as to the frequency employed. The general tenor of the disclosure implies that the frequency utilized is mains frequency, i.e. 60 Hz in the USA.

It is also known from UK Patent No 2128900 to provide a lever-operated spraying device in which an atomized spray is produced from a nozzle by squeezing the lever. This device includes a needle electrode positioned at or adjacent the nozzle and high voltage is applied to the needle electrode to ionize the spray emerging at the outlet of the nozzle. In one embodiment, the voltage generator is piezo-electric and the action of alternately squeezing and releasing the lever results in high voltage pulses of successive opposite polarity being applied to the electrode. During the squeezing action, spray is produced and the resulting droplets are charged by corona discharge from the electrode. During the release action, no spray will be produced but the high voltage at the needle may reverse in polarity to produce a corona discharge which may serve to eliminate or modify static when the device is used in certain applications.

SUMMARY OF THE INVENTION

The present invention resides in the recognition that certain advantages can be derived from the use of alternating potential sources by appropriate selection of the frequency of the source.

One of the problems of using electrostatic spraying apparatus is to prevent the operator from experiencing electrical shocks which may be perceived as unpleasant or may expose the operator to risk. For example, where a direct current electrostatic spraying device which is wholly hand held is used ( and hence where no other path to ground exists other than through the operator), if the operator is or becomes substantially isolated from ground (for instance, as result of standing on a synthetic fiber carpet or wearing shoes having soles of insulating material), during spraying charge will accumulate on the operator and, if the operator subsequently touches a grounded conductor, he/she will experience an electrical shock. Such electrical shocks can expose the operator to risk either through the magnitude of the electrical discharge itself or as a result of an involuntary reaction on the part of the operator in response to the electrical discharge.

According to the present invention there is provided an electrostatic spraying device adapted for shock suppression comprising a nozzle, means for supplying liquid to the nozzle, and high voltage circuitry arranged so that, in use, liquid sprayed in atomized form from the nozzle is electrostatically charged, the high voltage circuitry providing an output which alternates between opposite polarities with a frequency no greater than 10 Hz so that the spray is alternately charged positively and negatively.

Preferably the frequency is no greater than 3 Hz, more preferably no greater than 1 Hz.

Preferably the frequency is at least 0.05 Hz, more preferably at least 0.2 Hz.

In practice, the effectiveness of the shock suppression will to some extent be dependent on the nature of the liquid to be sprayed and the flow rate of the liquid. A frequency in the range of 0.2 to 3 Hz will usually suffice for most circumstances. Frequencies less than 0.2 Hz may however be satisfactory provided that the resistivity of the liquid is not low and provided that the flow rate is not high. For example, in subjective tests carried out, it was found that using a liquid having a resistivity of about $5 \times 10^6$ $\Omega$cm at a flow rate of 0.8 ml/min gave a very slight shock at a frequency of 0.175 Hz whereas using the same liquid at a flow rate of 0.3 ml/min, the frequency could be reduced to 0.125 Hz before a slight shock of subjectively the same magnitude was experienced. Similarly, using a liquid having a resistivity of $1.4 \times 10^7$ $\Omega$cm and a flow rate of 0.3 ml/min, the frequency could be reduced to about 0.05 Hz before a shock of subjectively the same magnitude as that referred to above was experienced.

Thus, by appropriate selection of the frequency, it is possible to eliminate the sensation of electrical shock by the operator or at least reduce the sensation to a level at which the risk of an accident as a result of an involuntary reaction by the operator is reduced.

The high voltage circuitry may comprise two high tension generators producing outputs of opposite polarity and switching means arranged to render the generators effective alternately to effect charging of the liquid, the frequency of switching being no greater than the frequencies specified above.

Alternatively, it is contemplated that the high voltage circuitry may comprise a single high tension generator producing a bi-polar output.

According to a feature of the present invention there is provided a high voltage circuitry comprising a voltage multiplying circuit having:

input terminal means for connection to a pulsed voltage source;

output terminal means for providing an output voltage which is bipolar and is a multiple of the voltage applied to the input terminal means;

two parallel sets of serially connected capacitors connected between the input and output terminal means; a plurality of paired bi-directional switches interconnecting the sets of capacitors in such a way that each junction between successive capacitors in one of said sets is connected to a pair of said switches which couple the junction to opposite sides of a capacitor of the other set; and means for effecting alternating operation of the switches of each pair in phased relation with the pulsed voltage source and for cyclically varying such phased relation to cause the output voltage at the output terminal means to alternate between opposite polarities.

Preferably the device is adapted to accommodate one or more low power batteries which may be of the rechargeable type, means being provided for producing from the battery supply voltage a pulsed voltage for application to the input terminal means of the voltage multiplying circuit. Means may also be provided for effecting a preliminary multiplication step so that the magnitude of the pulsed voltage applied to the voltage multiplying circuit is a multiple of the battery supply voltage.

Conveniently, the bi-directional switches are self-commutating, i.e. when triggered into a "on" state they do not require the triggering signal to be maintained in order to remain on but will remain on until current flow through the switch ceases.

In a preferred embodiment of the invention, the switches are constituted by triacs which are self-commutating devices.

Advantageously, the triacs are of the known type which can be triggered by optical signals.

It is preferred that a device according to the invention is operated at a frequency somewhat lower than 10 Hz because frequencies at the higher end of the specified range tend to give rise to contamination problems. It would appear that at the instant of switchover, a situation exists in which the nozzle is at for example a negative potential and is "looking" at a receding spray cloud of positive polarity. In such circumstances, it would appear that there is a tendency for the receding positive spray to be "pulled back" towards the nozzle with the risk of contamination. Also as the frequency is increased the risk increases of collision between a newly issuing spray cloud of one polarity and a receding spray cloud of the opposite polarity, and hence the formation of larger, discharged particles. For these reasons, it is contemplated that optimum operation of the device will be at a frequency no greater than 5 Hz.

The device may be in a form suitable to be held in the hand and may comprise a housing including a hand grip portion, the housing mounting the nozzle and accommodating the high voltage circuitry and a power source. The hand grip portion conveniently includes a trigger action for turning the spray on and off.

BRIEF DESCRIPTION OF THE DRAWINGS

An embodiment of the invention will now be described, by way of example, with reference to the accompanying drawings, in which:

FIG. 1 is a schematic view in cross section of an electrostatic spray gun embodying the invention;

FIG. 2 is a schematic diagram of the high voltage circuit of the gun of FIG. 1;

FIG. 3 is a cross section of a container for use in the gun of FIG. 1;

DETAILED DESCRIPTION OF A PREFERRED EMBODIMENT

Figure 4:
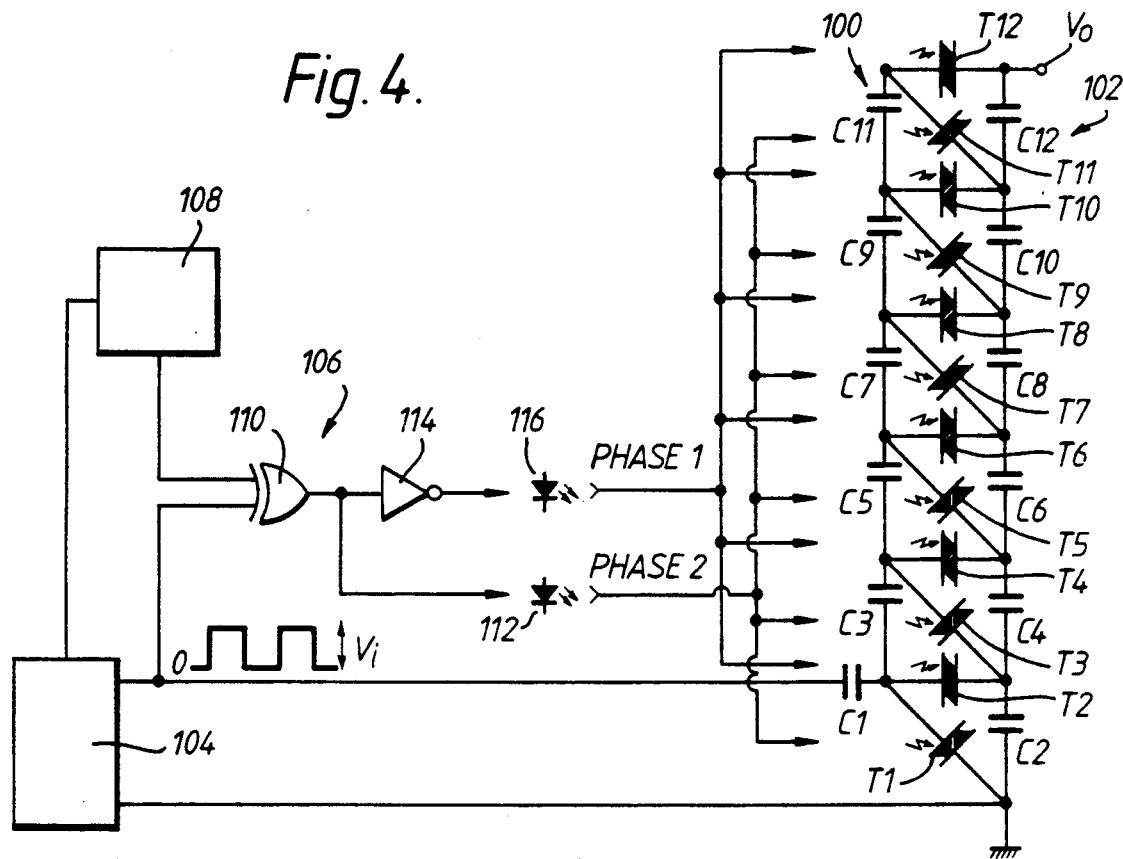
FIG. 4 shows one embodiment of a schematic voltage multiplying circuit for use in generating a bi-polar high voltage output.
Figure 5:
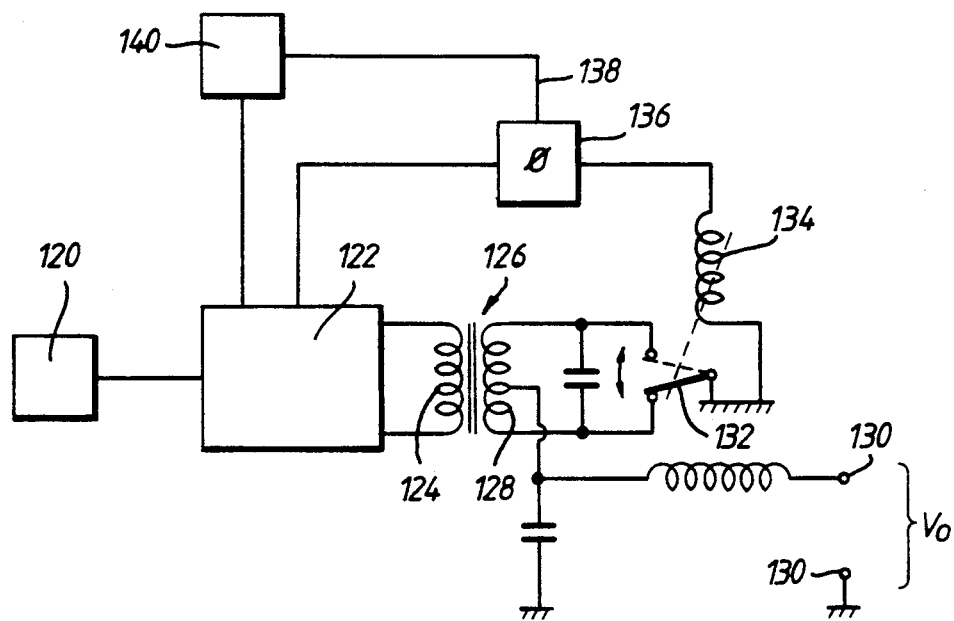
FIG. 5 shows another embodiment of a schematic voltage multiplying circuit for use in generating a bi-polar high voltage output.

The invention may be embodied in any shape convenient to the purpose to which it is to be put. The embodiment illustrated is in the form of a spray gun.

The spray gun illustrated in FIG. 1 has a body member 2 and a hand grip 4. The body member 2 is in the form of a tube of insulating plastics material. The body member is externally threaded at its end 6 to receive an end cap 8, which may also be of plastics material selected from the same group. Alternatively the end cap may be of a less insulating material, for example Tufnol Kite brand. The end cap 8 has a central aperture 10 through which, in use, a nozzle 12 projects. Means, in the form of a container 14, is provided for delivering liquid to be sprayed through the nozzle. The nozzle 12, which is permanently attached to the container 14, has a shoulder 16 which is received by a recess 18 on the inside of the end cap, thereby to locate the nozzle accurately centrally of the end cap. The container may be replaced by removing the end cap.

The container is pressurised by a liquified propellant which is separated from the liquid to be sprayed by a metal foil sack 19 (FIG. 3). The supply of fluid to the nozzle 12 is switched on and off by a valve 20 with which a passage 22 in the nozzle communicates. As in the case of an aerosol can, pressing the valve 20 relatively towards the container 14 opens the vale allowing liquid to be propelled from the container by the pressurized propellant and into the passage 22 of the nozzle. An internal restriction in the container 14 limits the flow rate to a low value, the outlet 24 of the nozzle at very low pressure which is not sufficient to cause any or significant atomization in the case of non aqueous liquids, or so as to cause only poor atomization in the case of aqueous liquids. The nozzle may be insulating or semi insulating. It is preferred that the nozzle is insulating being made from a material having a resistivity greater than $10^{14}$ ohm cm. Examples of such materials are ABS, polypropylene, polyethylene, polyvinyl chloride, acrylic, polycarbonate, acetal. The liquid must conduct sufficiently so that the voltage drop caused by the resistive effect of the liquid is not so great as to reduce the voltage at the nozzle to a value which spoils the quality of, or prevents, sprayinq. In oases where the liquid has too high a resistivity, the nozzle may be made from a more conductive material so that it acts as a resistor in parallel with the resistance presented by the liquid. In the extreme case of a highly insulating liquid, the material of the nozzle may have a bulk resistivity of $10^7$ ohm cm, the resistivity normally being above this value. Ceramic materials may be made with such values of resistivity. The container 14 is conducting, in this example.

In the example illustrated a single filament or ligament of liquid issues from the tip of the nozzle. In other examples, the nozzle may be annular or in the shape of a plane blade so that a plurality of ligaments of liquid issue therefrom.

At the end of the body member 2 remote from the nozzle 2, high voltage circuitry 26 is situated in a tubular carriage 28. The carriage 28 is slidable in the body member 2 and is biased away from the end cap 8 by a tension spring 29. The circuitry 26 has a high voltage output pole 30 connected to a contact schematically indicated at 32 for contact with the conducting container 14. The output pole 30 provides an alternating output, the frequency of which is no greater than 10 Hz. The other high voltage output pole is electrically common with a low voltage supply lead 34 and thus connected via a resistor 36 to a contact strip 38 on the exterior of the hand grip 4. The low voltage supply lead is connected to one pole of a battery 40. The other pole of the battery is connected to the circuitry 26 by another low voltage supply lead 42 via a microswitch 44.

The valve 20 is opened, in use, by relative movement between the container 14 and the body 2, the nozzle 12 remaining fixed in relation to the body. Movement to operate the valve is applied to the container by movement of the carriage 28. To this end, the grip 4 has a trigger 46 which when squeezed operates on one end of a lever 48 which is pivotally mounted at 50. Movement of the lever 48 is communicated by a link 51 to a further lever 52 which is pivotally mounted at one end 54. A central portion 56 of the lever 52 bears on the end of the carriage 28 remote from the container 14 so that when the trigger 46 is squeezed, resulting movement thereof is translated into movement of the carriage, and thus the container, towards the nozzle, that opening the valve 20. As this happens a linkage 58 operates the microswitch 44 so that power is supplied to the circuitry 26. The high voltage output from the circuitry 26 is thus applied to the container and so to the liquid therein. The high voltage is thus conducted to the tip of the nozzle, via the liquid in the case of an insulating nozzle, where the electric field strength is sufficient to produce a charged spray. In the case of a semi insulating nozzle, the nozzle itself contributes to the conduction.

The spray may be formed preponderantly by electrostatic forces, suitable liquids for such operation preferably having a resistivity in the range $1 \times 10^5$ to $5 \times 10^{10}$ ohm cm in the case of non-aqueous liquids. In the case of more conducting liquids and aqueous liquid systems, a jet may be produced by hydraulic pressure, even in the absence of the high voltage, which jet breaks up into coarse droplets. The addition of the high voltage creates an electric field which accelerates the jet (as in the case of more resistive liquids) and improves the spray by decreasing the droplet size and, since like charges repel each other, spreading the spray out into more of a cloud.

The grip is held in hand and the trigger is squeezed as explained above. The hand contacts the conducting strip 38 to provide a ground circuit. It will be understood that the ground is optional but, when present, serves to provide capacitance with respect to ground. The high voltage is shown schematically in FIG. 2. The contact strip 38 is connected via a person (the operator of the gun) to ground. In normal use the current through the operator is too small to feel or to pose any kind of danger. The circuitry 26 comprises a pair of high tension generators 80 connected in a circuit with the battery 40 and microswitch 44. Each generator 80 is also connected via lead 34 and a resistor 36 to the contact strip 38. The generators 80 are arranged so that they produce at outputs 82, 84 a dc high voltage typically of the order of 15 kV of opposite polarity to one another and the outputs 82, 84 are connected via gating circuitry 86 to the output lead 30, the gating circuitry 86 being arranged to switch between the generator outputs 82, 84 at a rate which will provide an alternating high voltage output of frequency up to 10 Hz and ranging typically between +15 kV and −15 kV. The output lead 30 is connected to the container 14 and so via the liquid therein to the tip of the nozzle 12. Liquid issues from the nozzle in the form of a filament or ligament which breaks up into a spray of charged droplets 66. Successive spray clouds of droplets will be oppositely charged by the alternating generators 80. The droplets are attracted to a grounded object 68, which may be an intended or unintended target. Earth may be used to complete the circuit through the operator.

If, when the apparatus is being used, the operator is substantially isolated from earth and touches a grounded conductor, the use of an alternating high voltage prevents the build-up of a charge on the operator of sufficient magnitude to be experienced as a shock or, if any shock is experienced, it will not be one which causes a person to react involuntarily to a significant extent. Also by limiting the frequency of the alternating potential so that it is no greater than 10 Hz (more preferably no greater than 3 Hz), undesirable contamination resulting from the "pull back" effect previously mentioned can be reduced or minimized.

In the embodiment shown in FIG. 2, the high voltage circuitry comprises two high voltage generators producing opposite polarity outputs. FIG. 4 illustrates diagrammatically a bi-polar high voltage circuit which may form the voltage generator illustrated in FIG. 1. In this embodiment, the production of a bipolar high voltage output is effected by means of modified Cockcroft-Walton voltage multiplier circuit. A conventional Cockcroft-Walton multiplier comprises two parallel sets of serially connected capacitors with diodes interconnecting the two sets whereby the peak value $V_i$ of an input voltage to the multiplier is transformed to a unipolar output $nV_i$ where n corresponds to the number of diode/capacitor stages in the multiplier.

As shown in FIG. 4, the high voltage generator comprises two parallel sets 100, 102 of serially connected capacitors C1-C12 connected to an input voltage source 104. The voltage source 104 produces a high frequency pulse train, typically 20 kHz with a square waveform and a 50% duty cycle, derived from the battery supply 40 using a suitable pulse generator such as a multivibrator. The voltage level of the pulse train ranges between a high level, $V_i$, and a low level, such as zero, (assuming positive logic). The level $V_i$ will typically be a multiple of the battery supply voltage produced, for example, by an intermediate voltage multiplying circuit.

Instead of diode interconnections as in a conventional Cockroft-Walton multiplier, the sets of capacitors are interconnected by triggerable bi-directional switches T1-T12. The bi-directional switches T1-T12 are arranged in pairs coupling each junction between the capacitors of one set 100 to opposite sides of a capacitor in the other set 102. The switches are controlled cyclically so that the switches forming each pair are in antiphase relation, i.e. during part of the cycle, switches T1, T3 . . . Tn (where n is odd) are closed while switches T2, T4 . . . Tm (where m is even) are open, and vice versa during the remainder of the cycle.

Although the invention is not limited to any particular form of bi-directional switch, as shown in FIG. 4, the switches T1–T12 preferably are in the form of triacs which are opto-electronically controllable. The switches may for example comprise MOC 3020 optically isolated triacs manufactured by Motorola which feature a gallium arsenide infrared emitting diode (LED) and a light activated bi-lateral switch. In the circuit of FIG. 4, the LED associated with each triac device is controlled by a logic circuit 106 in such a way that the LED's associated with switches Tn are energized in anti-phase relation with those associated with switches Tm and also in such a way that LED energization is in a particular phase relation with the input voltage pulse train produced by source 104.

The logic circuit receives inputs from a control signal source 108 and the input voltage source 104. The control signal produced by the source 108 comprises a control pulse train having a pulse repetition rate corresponding to the frequency at which the high voltage generator is required to operate. For example, the control pulse train may be derived by means of suitable frequency divider circuitry (not shown) from the voltage input pulse train produced by the source 104. The logic circuit 106 comprises an exclusive OR gate 110 the output of which is supplied, on the one hand, direct to one set 112 of LED's (for example those associated with the switches Tn) and, on the other hand, via IN-VERTER 114 to the other set 116 of LED's. In FIG. 4, only one LED of each set is illustrated for simplicity.

When the control signal produced by source 108 is high, the inverted output of the gate 110 (i.e. the output of INVERTER 114) is in phase with the high frequency input voltage produced by the source 104 while the non-inverted output of gate 110 is in anti-phase relation with the input voltage. Consequently, the LED set 116 is energized when the input voltage is high and set 112 is energized when the input voltage is low. Thus, while the control signal is high, the output voltage $V_o$ will be a multiple of the input voltage $V_i$ and will have a predetermined polarity, i.e. positive.

When the control signal produced by source 108 is low, the inverted output and non-inverted outputs derived from the gate 110 are respectively in anti-phase relation and in-phase relation with the input, voltage Consequently, the LED set 116 is energized when the input voltage is low and set 112 is energized when the input voltage is high. Thus, when the control signal is low, the output voltage $V_o$ will be a multiple of the input voltage $V_i$ and will have the opposite polarity, i.e. negative.

In FIG. 4, for simplicity, only a limited number of multiplier stages are illustrated; it will be appreciated that, in practice, there will be a larger number required in order to produce the high voltages needed for electrodynamic spraying. For instance, if the source 104 produces an output voltage of 800 V (derived by multiplication of the battery supply voltage by an intermediate voltage multiplier) then the voltage multiplier of FIG. 4 may comprise 18 stages in order to obtain an output $V_o$ of about 14 kV.

Referring now to FIG. 5, an alternative bi-polar high voltage generator for use as the generator 26 of FIG. 1 comprises an input dc voltage source 120 of several hundred volts derived from the battery supply voltage 40 by means of an intermediate voltage multiplying circuit (not shown) comprising, for example, a relaxation oscillator, transformer and rectifying circuit. The dc voltage provided by the source 120 is converted to a high frequency alternating current, e.g. 20 kHz, in a circuit 122 including an oscillator and the primary 124 of a transformer 126 thereby repeatedly reversing current flow through the primary. The secondary 128 of the transformer is center tapped to provide an output at terminals 130, the magnitude of the output being determined by the turns ratio of the transformer.

A mechanical switch 132, such as a gas filled vibrating switch, is connected so as to alternately connect the opposite ends of the transformer secondary to ground at a frequency corresponding to the oscillation produced in the primary. Alternating operation of the switch 132 is controlled by a coil 134 energized by a control signal which is derived from the circuit 122 and has a frequency corresponding to the frequency at which current reversal in the primary takes place. The switch 132 is thereby caused to operate synchronously with the current reversal taking place in the primary and serves to convert the ac output of the transformer secondary to dc at the terminals 130. The polarity of the output is determined by the relative phase between the control signal applied to the coil 134 and the current supplied to the transformer primary. By changing the phase relation from in-phase to anti-phase (or vice versa), the polarity of the output seen at terminals 130 can be reversed. Such reversal is controlled by phase control circuit 136 which is operable to shift the phase of the control signal applied to the coil 134 in dependence on a clock signal applied to an input line 138 to the phase control circuit 136. The clock signal is derived from a pulse generator 140 which is coupled to the oscillator of circuit 122 and has a pulse repetition rate corresponding to the frequency at which the voltage generator is required to operate.

Thus, for example, when the clock signal is high, the phase control circuit 136 may be switched into a condition in which the control signal applied to the coil 134 is in phase with the current flow through the primary and, when the clock signal is low, the phase control circuit may be switched into a condition in which the control signal is shifted 180° so as to be in in anti-phase relation with the current flow through the primary. In this way, a bipolar high voltage output is obtained at the terminals 130 which reverses polarity at a rate determined by the clock signal.

We claim:

1. A self-contained electrostatic spraying device which is suitable for hand-held use and is adapted for shock suppression comprising:
   - a nozzle having a nozzle outlet;
   - means for supplying liquid to said nozzle;
   - high voltage circuitry arranged so that, in use, liquid emerging at said nozzle outlet is subject to an electrical field sufficiently high to draw said liquid from said nozzle in the form of at least one ligament which breaks up into charged droplets to form a spray;
   - means for providing a ground return path from the device through the hand of the operator;
   - said high voltage circuitry comprising a bi-polar voltage generator producing an output which alternates with a frequency no greater than 10 Hz so that said spray is alternately charged positively and negatively in such a way as to effect shock suppression by preventing a build-up, in use, of charge on an operator holding the device.

2. A device as claimed in claim 1 in which said frequency is no greater than 5 Hz.

3. A device as claimed in claim 1 in which said frequency is no greater than 3 Hz.

4. A device as claimed in claim 1 in which said frequency is not greater than 1 Hz.

5. A device as claimed in any one of claims 1, 2, 3 or 4 in which said frequency is at least 0.05 Hz.

6. A device as claimed in any one of claims 1, 2, 3 or 4 in which said frequency is at least 0.2 Hz.

7. A device as claimed in claim 1 in which said device comprises a housing including a hand grip portion, said housing mounting said nozzle and accommodating said high voltage circuitry and a power source.

8. A device as claimed in claim 1 in which said high voltage circuitry comprises a voltage multiplying circuit having:
   - input terminal means for connection to a pulsed voltage source;
   - output terminal means for providing an output voltage which is bipolar and is a multiple of a voltage applied to said input terminal means;
   - two parallel sets of serially connected capacitors connected between said input and output terminal means;
   - a plurality of paired bi-directional switches interconnecting said sets of capacitors in such a way that each junction between successive capacitors in one of said sets is connected to a pair of said switches which couple said junction to opposite sides of a capacitor of another set; and means for effecting alternating operation of said switches of each pair in phased relation with said pulsed voltage source and for cyclically varying such phased relation to cause said output voltage at said output terminal means to alternate between opposite polarities.

9. A device as claimed in claim 1 in which the high voltage is applied to the nozzle.

10. A device as claimed in claim 1 in which said high voltage is applied to said nozzle via said liquid supply to said nozzle.

11. A method of effecting shock suppression during operation of a hand-held electrostatic spraying device comprising a nozzle and means for supplying liquid to the nozzle for production of an atomized spray wherein such operation is accompanied by the application of electrical charge to an operator, said method comprising:

electrostatically charging said liquid by means of high voltage circuitry and providing an output which alternates between opposite polarities with a frequency no greater than 10 Hz so that said spray is alternately charged positively and negatively in such a way as to prevent build-up of charge on said operator in the event of the latter being or becoming isolated from earth.

12. A method as claimed in claim 11 in which said frequency lies within the range 0.05 to 5 Hz.

13. A method as claimed in claim 11 in which said frequency lies within the range 0.2 to 3 Hz.

14. A method as claimed in claim 11 comprising discharging said liquid from said nozzle in successive spray clouds of droplets such that said droplets in each spray cloud are oppositely charged with respect to said droplets in immediately preceding and succeeding clouds.

* * * * *